United States Patent [19]

Lucas et al.

[11] Patent Number: 4,560,096

[45] Date of Patent: Dec. 24, 1985

[54] DETACHABLE BAG INTENDED PARTICULARLY FOR USE WITH A MOBILE CONTAINER

[76] Inventors: Peter Lucas; John Staveley, both of 42-46 Broad St., Portsmouth, Hampshire, P01 2JF, England

[21] Appl. No.: 599,156

[22] Filed: Apr. 11, 1984

[51] Int. Cl.⁴ .................................................. B62B 5/00
[52] U.S. Cl. ................................ 224/42.42; 224/273; 248/100; 280/33.99 A; 280/DIG. 3
[58] Field of Search .................... 248/95, 99, 100, 101; 220/404, 401; 224/273, 42.42; 280/DIG. 3, DIG. 4, 33.99 A; 383/8, 7, 12, 23, 6; 141/396

[56] References Cited

U.S. PATENT DOCUMENTS

| | | | |
|---|---|---|---|
| 644,038 | 2/1900 | Whalley | 383/12 |
| 2,348,964 | 5/1944 | Dodson | 383/6 X |
| 3,425,618 | 2/1969 | Cohen | 383/7 X |
| 3,506,048 | 4/1970 | Jortikka | 383/6 |
| 3,630,251 | 12/1971 | Ross | 383/23 X |
| 3,675,940 | 7/1972 | Crookston | 248/98 X |
| 3,796,402 | 3/1974 | Trotta | 248/101 X |
| 3,806,146 | 4/1974 | Shaw | 280/DIG. 3 X |
| 3,861,630 | 1/1975 | Ady | 248/100 |
| 3,977,450 | 8/1976 | Schampier | 220/404 X |
| 4,101,104 | 7/1978 | Minard | 248/95 |
| 4,244,408 | 1/1981 | Shoda | 383/8 X |
| 4,418,835 | 12/1983 | Watts | 248/100 X |

FOREIGN PATENT DOCUMENTS 2116490  9/1983  United Kingdom ........ 280/33.99 A Primary Examiner—Stephen Marcus
Assistant Examiner—Robert Petrik
Attorney, Agent, or Firm—Roylance, Abrams, Berdo & Goodman

[57] ABSTRACT

The disclosure relates to a bag and is intended to receive a load. The bag has gripping handles and hooks for securing the bag to the mobile container body, the securing hooks being employed when the bag cooperates with the container body and inactive when the bag is not cooperating with the container and, inversely, the gripping handles being inactive when the bag is cooperating with the container and active when the bag is not cooperating with the container.

3 Claims, 7 Drawing Figures

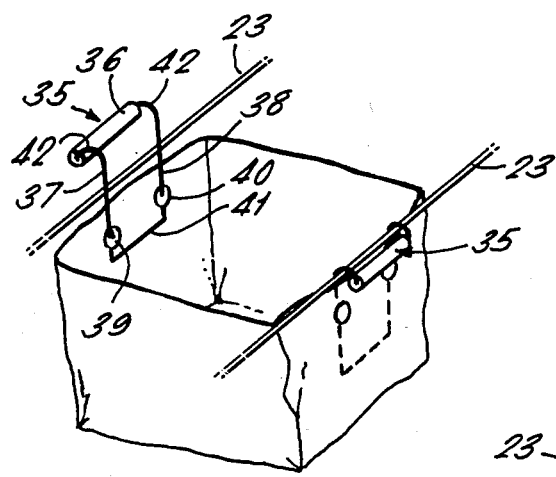
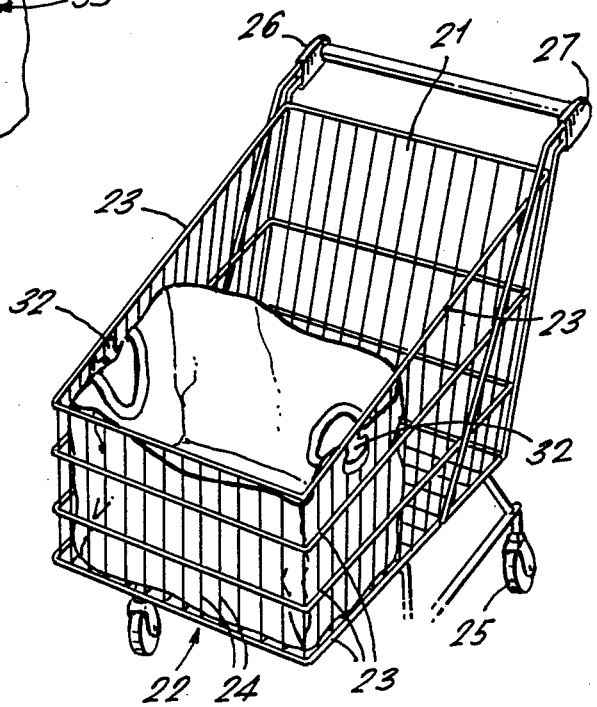
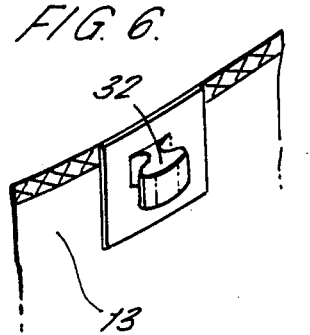
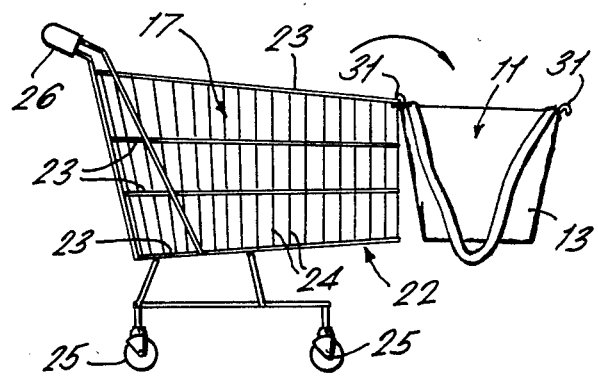

DETACHABLE BAG INTENDED PARTICULARLY FOR USE WITH A MOBILE CONTAINER

BACKGROUND OF THE INVENTION

1. Field of the Invention

The invention relates to a detachable bag suitable for holding a number of separate loose articles and for use with a mobile container or trolley.

2. Description of the Prior Art

In modern towns, numerous supermarkets offer to their customers at the entrance mobile containers or trolleys which can receive and convey items of shopping which most frequently take the form of numerous small and medium-sized packets. These containers generally comprise a pseudo-parallelepipedal body open at its top and carried by four swivelling wheels and provided at the rear end with handles or with a transverse bar enabling the container to be pushed. Thus, as purchases are made, the user places inside the body the packaged provisions or cleaning materials. At the exit from the shop, after payment, the user takes the mobile container to his or her vehicle, removes the packets from the container and then places them in the boot of the vehicle.

Accordingly, this mode of procedure makes it necessary for the purchased items to be handled several times.

The first handling takes place when the purchaser chooses the items and places them in the container, a second handling occurs when the purchaser places the items on the conveyor belt at the cashier's desk, who then adds up the total, a third handling takes place when the user places the items on the conveyor belt so as to put them into the mobile container, a fourth handling takes place when the shopper fills the boot of his or her vehicle and, finally, a fifth and last handling takes place when the user empties the boot to place the provisions and cleaning articles in storage cupboards or refrigerators. To allow a more convenient handling of the purchased items, shopkeepers make available to their customers empty packaging boxes placed randomly at the exit from the store. Sometimes they offer a plurality of small plastics bags. However, these makeshift means are not very practical for the user. They tear under the weight of the contents or do not include handles if boxes are involved. Moreover, the plastics bags supplied by the shop-keeper represents an appreciable cost to the latter. Furthermore, the bags supplied have a small volume, which necessitates the use of a large number of bags. Finally, these bags are not very strong and frequently they cannot be used more than once.

The invention aims to obviate these disadvantages.

SUMMARY OF THE INVENTION

The invention thus provides a detachable bag intended to receive a load, characterised in that it comprises, in combination, gripping means for lifting the bag and means for securing the bag to a mobile container, said securing means being active when the bag cooperates with the container and inactive when the bag is not cooperating with the container and, inversely, said gripping means being inactive when the bag is cooperating with the container and active when the bag is not cooperating with the container.

Moreover, according to the invention, the gripping means and the securing means are separate from a structural point of view.

According to another embodiment, the gripping means and the securing means are formed by the same handling member which acts alternately as gripping means and securing means.

The bag according to the invention is so designed that its volume and size are substantially the same as the volume and size of the mobile container.

Preferably, the volume of the bag is equal to half the volume of the container.

According to one specific embodiment, the gripping means comprise at least one handle formed by a strap, in particular of flexible material. The securing means then comprise a hook, the head of which engages with attachment means arranged on the side of the container opposite the side of the bag carrying the securing means. The attachment means are preferably disposed on the upper edge of the side of the container. More preferably, the attachment means are formed by an upper longitudinal bar forming the framework of the container, by a groove provided on the upper edge or by two transverse central bars forming the framework of the container.

According to another embodiment, the securing and gripping means comprise a bar substantially parallel to the upper edge of the side of the container which cooperates with the securing means. When the securing means are active, the bar bears on the upper edge of the side of the container and, when the gripping means are active, the bar is no longer supported and the user holds this bar by hand.

BRIEF DESCRIPTION OF THE DRAWINGS

FIG. 4 is a view of part of a container or trolley showing a third form of bag having another form of securing means;

FIG. 5 is view of a container or trolley provided with a fourth form of the bag having a still further form of securing means;

FIG. 6 is detailed view of another form of the securing means; and

FIG. 7 is a side elevation of a container or trolley provided with a detachable bag of yet another form.

DESCRIPTION OF THE PREFERRED EMBODIMENTS

Figure 1:
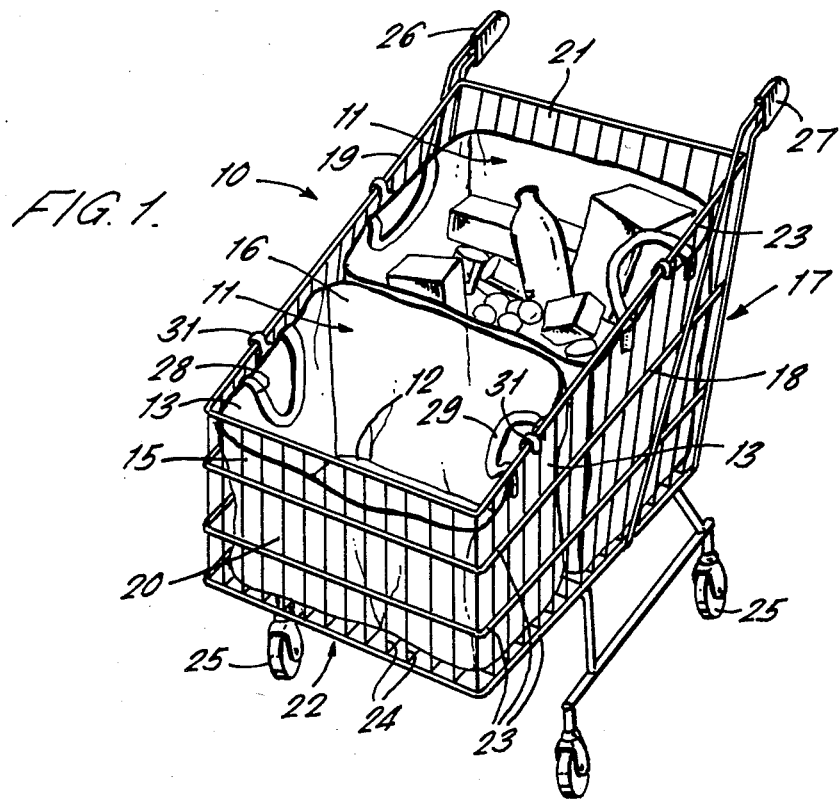
FIG. 1 is a view in perspective of a mobile supermarket type trolley or container containing a detachable bag for holding provisions or other goods.

Referring firstly to FIG. 1 of the drawings there is shown a "supermarket" type trolley or container 10 in which two bags 11 are disposed along the container to receive goods purchased at a supermarket or similar store such as separately packaged provisions, cleaning materials or beverages.

Each bag 11 comprises a bottom 12, two sides 13, 14 and two ends 15, 16. The bags are formed to fit end to end in the mobile container 10 which comprises an open topped parallelepipedic form body 17 having two sides 18, 19, a front end 20, a rear end 21 and a bottom 22. Generally, the container body is formed by a framework comprising at least four bars 23 extending around the body parallel to the bottom 17 and a plurality of parallel bars 24 perpendicular to the bars 23. Castors 25 are mounted below the container body to enable the container to be moved by pushing it in particular by means of two handles 26,27.

According to the invention, the bag 11 has gripping means and means for securing the bag to the mobile container 10. The securing means are active when the bag cooperates with the container and are inactive when the bag is not cooperating with the container. Conversely, the gripping means are inactive when the bag cooperates with the container and are active when the bag is not cooperating with the container.

Thanks to the bag according to the invention, the user is able to carry the bag, the gripping means being active, then after having placed the bag in the container the securing means thus becoming active, the bag is fixed in the container.

In the embodiment of FIG. 1 the gripping means are structurally separate from the securing means, that is, the members constituting the gripping means are different to the members constituting the securing means. Thus, as illustrated in FIG. 1, the gripping means comprise handles 28, 29 formed by lengths of flexible and strong strap material. The handles 28, 29 have end parts fixed respectively to the upper edges the two opposite sides 13 of the bag.

Therefore, the user is provided with two handles 28, 29, opposite to one another and which the user can grip so as to carry the bag; the securing means being inactive during carrying. The size of the strap forming the handles is as illustrated sufficient to be loosely wrapped around the palm of the hand.

According to another embodiment illustrated in FIG. 7 the bag has at least one handle 30, the end parts of which are fixed to the upper edges of two opposite sides or ends of the bag. This handle is thus sufficiently long to enable the user to carry the bag over or across the shoulder.

Figure 2:
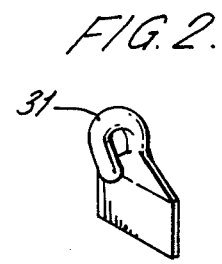
FIG. 2 is detail view of a hook used as securing means on the bag of FIG. 1.

The securing means comprise hooks 31 (FIG. 2) attached to the upper edge of the bag between the attachment points of the respective handle ends. The hooks are formed to engage with attachment means at the top edges of the sides 18,19 of the container 17. More specifically the attachment means can be formed by the upper longitudinal bars 23 forming the framework of the sides of the containers 17. Alternatively the bag could be turned through 90° (e.g. as shown in FIG. 7) and one hook on the bag could then be attached to the upper bar of the front or the rear side of the container. Otherwise, the attachment means may comprise a groove or channel (not shown) formed in one of the front or lateral sides of the container to receive the hook or hooks.

Further arrangements are shown in FIGS. 5 and 6 in which the securing means are of toggle form 32 to lock between two adjacent upright bars 24 of the the framework of the container 17.

As indicated above, the securing means may be connected to only one side 16 of the bag, as shown in FIG. 7. These securing means 31 then cooperate with a single side 20 of the container, namely the front or the rear side.

Thus, the user may place the bag either to the front of (as shown) or behind the container 17 and fills the bag 11 with provisions or other items. It is thus necessary to provide a counter-weight or load situated at the front of the container 17 or to shift its centre of gravity in any other way so as to prevent it from tipping over. Otherwise the user can place the goods in the container 17 whilst shopping and, after payment, transfer them from the container to the bag, in the direction of the arrow F1 indicated on FIG. 7.

According to another embodiment illustrated in FIG. 4, the bag 11 is so designed that the gripping means and the securing means are formed by the same handling member 35 which acts alternately as gripping means and securing means. Thus, according to a first example, the handling member comprises a bar 36 substantially parallel to the upper edge of the side 13 of the container which cooperates with the securing means (FIG. 4).

More particularly, the bar 36 is supported by two mutually parallel cords 37, 38, which are substantially parallel to the bar 36 and which pass through two eyes 39,40 provided on the sides 13 of the bag opposite the side 17, 18 of the container 17. The two cords 37, 38 are joined by a third cord 41 parallel to the bar 36 and situated inside the bag 11 for example.

At their end portions adjacent the bar 36, the cords 37, 38 comprise curved portions 42 having the purpose of supporting the bar 36 in a plane situated on the opposite side, in relation to the side 13 of the bag 11, to the plane passing through the three cords 37, 38, 41. Therefore, the user can grip the bag 11 by the bar 36. The cord 41 is then blocked by the eyes 39 and 40 and the securing means are inactive. When the user places the bag 11 in the container 17, the cord 41 is directed towards the bottom of the bag and the bar 36 comes to rest on the upper bar 23 of the container 17. This bar 36 is then situated in a plane outside the side 13 of the bag 11. The securing means are thus inactive.

Figure 3:
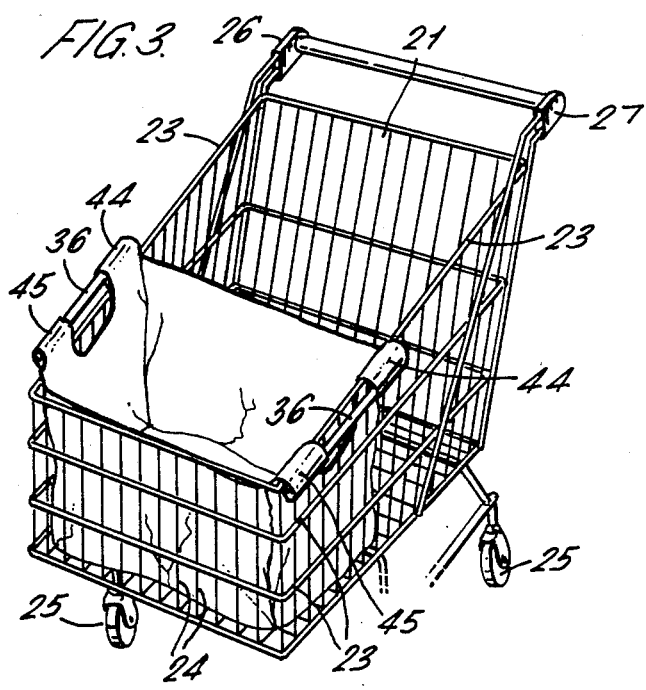
FIG. 3 is a view in perspective of a container or trolley containing a second form of bag having a different form of securing means.

Finally, provision can be made for the bar 36 to be disposed in loops 44, 45 (see FIG. 3) provided on the side 13 of the bag 11.

The loops 33, 45 are separated by an opening 46 situated below the bar 36. The bar 36, when grasped by the user, thus constitutes the gripping means. When the user places the bag 11 in the container 17 and releases the bar 36, this latter, under the action of its own weight, is positioned on the upper bar 23 of the container 17 in a plane situated outside the side of the container. The securing means are thus active.

Furthermore, provision can be made so that the volume v of the bag 11 and its dimensions are substantially equal respectively to the volume and dimensions of the container 17. According to another embodiment, the volume v of the bag 11 is substantially equal to half the volume V of the mobile container 1. Thus, as shown in FIG. 1, two bags 11 can be placed side by side in the container 17, which has the advantage of dividing in two the load carried by the user.

Finally, the material forming the bag is a synthetic material, preferably consisting of polymeric, which may also be reinforced with textile fibres, for example nylon fibres.

This material is more preferably translucent so as to prevent dishonest consumers from being tempted to place items between the container 17 and the bag 11.

Finally, sewn or detachable interior pockets can be provided on the sides of the bag 11.

Of course, the invention is not at all restricted to the modes of embodiment described above. Thus, provision can be made so that the bags used behind the container (FIG. 7) can be used with a container provided with a detachable rear front side. For example, the bags can be provided with an internal division.

I claim:

1. A detachable bag for use in a conventional open topped supermarket trolley container, the bag being formed from flexible sheet material and having a flat base part to rest in the bottom of the trolley container and upstanding walls to receive within them a supply of goods, the upper peripheral area of the bag having, on opposite sides thereof, similar downwardly facing hook means permanently secured to said upper peripheral area for engaging over the upper periphery of a supermarket trolley container to suspend said opposite sides of the bag from the upper end thereof, said hook means being engageable one with the other to close the bag, strap form handle means attached to the bag on opposite sides thereof, and each strap form handle being attached to the upper portion of the bag to either side of a respective hook means.

2. A bag according to claim 1, wherein the volume and size of the bag are substantially equal respectively to the volume and size of the container.

3. A bag according to claim 1, wherein the volume of the bag is equal to approximately half the volume of the supermarket trolley container.

* * * * *